(12) United States Patent
Cheong

(10) Patent No.: US 9,448,774 B2
(45) Date of Patent: Sep. 20, 2016

(54) DATA PROCESSING APPARATUS AND METHOD

(75) Inventor: Yun Gyung Cheong, Anyang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1011 days.

(21) Appl. No.: 12/755,527

(22) Filed: Apr. 7, 2010

(65) Prior Publication Data

US 2011/0066964 A1    Mar. 17, 2011

(30) Foreign Application Priority Data

Sep. 17, 2009    (KR) .................. 10-2009-0087926

(51) Int. Cl.
*G06F 3/048*     (2013.01)
*G06F 9/44*      (2006.01)
*G06F 17/22*     (2006.01)

(52) U.S. Cl.
CPC .............. *G06F 8/38* (2013.01); *G06F 17/227* (2013.01)

(58) Field of Classification Search
None
See application file for complete search history.

(56) References Cited

U.S. PATENT DOCUMENTS

| | | | |
|---|---|---|---|
| 5,481,740 A * | 1/1996 | Kodosky ............... | G06F 3/0481 345/440 |
| 5,678,013 A * | 10/1997 | Smith ................... | G06F 9/455 715/866 |
| 5,680,530 A * | 10/1997 | Selfridge .............. | G06T 17/00 345/440 |
| 5,963,739 A * | 10/1999 | Homeier ................ | 717/126 |
| 6,134,580 A * | 10/2000 | Tahara .................. | G06F 9/5066 709/202 |
| 6,173,297 B1 | 1/2001 | Moon et al. | |
| 6,640,249 B1 * | 10/2003 | Bowman-Amuah ..... | G06F 8/38 709/228 |
| 6,983,227 B1 * | 1/2006 | Thalhammer-Reyero ........ | 703/2 |
| 7,143,392 B2 * | 11/2006 | Ii et al. ................. | 717/125 |
| 7,181,686 B1 * | 2/2007 | Bahrs ................... | G06F 8/38 715/210 |
| 7,185,286 B2 | 2/2007 | Zondervan et al. | |
| 8,041,714 B2 * | 10/2011 | Aymeloglu et al. ......... | 707/726 |
| 8,051,408 B1 * | 11/2011 | Johnson ................. | G06F 8/33 715/705 |
| 8,306,526 B2 * | 11/2012 | Yonezawa ............. | H04W 16/20 340/425.2 |
| 2003/0011601 A1 | 1/2003 | Itoh et al. | |
| 2003/0058277 A1 * | 3/2003 | Bowman-Amuah ......... | 345/765 |
| 2004/0030741 A1 * | 2/2004 | Wolton ............. | G06F 17/30873 709/202 |
| 2005/0289088 A1 * | 12/2005 | Tian ..................... | G06F 8/20 706/1 |
| 2006/0106793 A1 * | 5/2006 | Liang ................. | G06F 17/30654 |
| 2006/0149782 A1 | 7/2006 | Yeh et al. | |
| 2007/0033519 A1 * | 2/2007 | Zdenek ................. | G06F 17/215 715/234 |
| 2008/0005628 A1 * | 1/2008 | Underdal et al. ............... | 714/57 |
| 2008/0163124 A1 * | 7/2008 | Bonev .................. | G06F 11/3664 715/853 |
| 2008/0232690 A1 | 9/2008 | Saund et al. | |
| 2008/0313584 A1 * | 12/2008 | Otsuka ................ | G06F 17/5022 716/106 |
| 2009/0005892 A1 * | 1/2009 | Guetta .................... | G06F 3/165 700/94 |
| 2009/0093902 A1 * | 4/2009 | Tiozzo et al. .................. | 700/105 |
| 2009/0113394 A1 * | 4/2009 | Weber .................... | G08F 8/10 717/126 |
| 2009/0158178 A1 * | 6/2009 | Birsan ................ | G06F 17/30126 715/762 |
| 2010/0005428 A1 * | 1/2010 | Ikeda .................. | G06F 3/04883 715/863 |

FOREIGN PATENT DOCUMENTS

JP    09-034957    2/1997

* cited by examiner

*Primary Examiner* — Matt Kim
*Assistant Examiner* — Hua Lu
(74) *Attorney, Agent, or Firm* — NSIP Law

(57) ABSTRACT

A data processing and displaying apparatus and method are provided. The apparatus and method may visualize and display interactive contents to be easily recognized where a number of nodes is large or branches are complex for visualized graph-typed input data. The data processing apparatus and method may also selectively display a portion of nodes or conditions desired by a user based on a particular user input.

17 Claims, 6 Drawing Sheets

FIG. 3

| NODE ID | PRECONDITION | POST-CONDITION |
|---|---|---|
| S1 | NILL | C1, C2 |
| S2 | C1, C4 | C7 |
| S3 | C2 | C4 |
| S4 | C4, C5 | C6 |
| S5 | C6, C7 | C9 |
| S6 | C9 | NILL |
| S7 | C9 | NILL |

FIG. 4

| CONDITION | SHAPE | COLOR | FREQUENCY |
|---|---|---|---|
| C1 | TRIANGLE | WHITE | 10 |
| C2 | SQUARE | RED | 2 |
| C3 | CIRCLE | BLUE | 5 |

DATA PROCESSING APPARATUS AND METHOD

CROSS-REFERENCE TO RELATED APPLICATION(S)

This application claims the benefit under 35 U.S.C. §119 (a) of Korean Patent Application No. 10-2009-0087926, filed on Sep. 17, 2009, in the Korean Intellectual Property Office, the entire disclosure of which is incorporated herein by reference for all purposes.

BACKGROUND

1. Field

The following description relates to a data processing technology, and more particularly, a data processing technology for dynamically displaying data as a graph and for generation and display of dynamic programming.

2. Description of Related Art

Various types of data structures may exist. A graph-typed data structure may be used to express interactive contents. The graph-typed data structure includes at least one node. The at least one node may be connected to other nodes using a branch. The graph-typed data structure may be different from a tree-typed data structure, where nodes above point to nodes below.

According to a wide range of industrial demands, it is desirable to have a data structure displayed such that it is readily recognized by a user, for example, when a user constructs a graph-typed data structure from a partially built graph-typed data structure where nodes exist that need to be linked to other nodes. To display the data structure as a graph, a scheme of visualizing each node, connecting the nodes in a line form using branches, and displaying data including useful suggestions such that a user may understand and construct a graph-typed data structure, has been proposed. However, according to the above scheme, a number of branches connecting the nodes may increase or the connection of the nodes may become complex. Thus, it may be difficult for users to discover candidate nodes to be connected to a specific node.

SUMMARY

In one general aspect, there is provided a data processing apparatus including a data analyzer to analyze input data having a graph structure, and to verify at least one of a precondition and a post-condition of each node included in the input data, an interface generator to allocate one or more interfaces including a different type of interface for each type of precondition and post-condition, and a display unit to visualize and display the input data based on the one or more allocated interfaces.

The data analyzer may verify a predicate and a predicate object with respect to at least one of the precondition and the post-condition of each node included in the input data, and the interface generator may allocate a different interface for each type of predicate and predicate object.

The interface generator may allocate a different color for each type of interface for each type of precondition and post-condition.

The interface generator may allocate an interface having a color that includes a low brightness to a condition which has a high frequency.

The interface generator may allocate an interface having a color that includes a low saturation to a condition which has a high frequency.

The interface generator may allocate a different shaped interface for each type of precondition and post-condition.

The interface generator may allocate an interface having a high complexity shape to a condition which has a high frequency.

The display unit may visualize and display each node included in the input data, and when a user input targeting a first node is detected, the display unit may visualize and display a node sharing the same condition as the first node to be distinguishable from other nodes.

The display unit may visualize and display each node included in the input data, and when a user input targeting a first condition is detected, the display unit may visualize and display a condition having the same condition as the first condition to be distinguishable from other conditions.

The user input may include a mouse cursor approaching a portion of the visualized and displayed first condition.

When the display unit visualizes and displays a condition having the same condition as the first condition to be distinguishable from the other conditions, the display unit may perform a twinkling process for a visualized and displayed condition corresponding to the same condition as the first condition.

In another general aspect, there is provided a data processing method of a data processing apparatus, the method including analyzing input data having a graph structure, and verifying at least one of a precondition and a post-condition for each node included in the input data, allocating one or more interfaces including a different type of interface for each type of precondition and post-condition, and visualizing and displaying the input data based on the one or more allocated interfaces.

The analyzing may include verifying the at least one precondition and post-condition of each node included in the input data, and verifying a predicate and a predicate object with respect to the at least one precondition and post-condition of each node included in the input data.

The allocating and the generating may include allocating a different interface for each type of predicate and predicate object.

The allocating may include allocating a different color for each type of interface for each type of precondition and post-condition.

The allocating may include allocating an interface having a color that includes a low brightness to a condition which has a high frequency.

The allocating may include allocating a different shaped interface for each type of precondition and post-condition.

The allocating may include allocating an interface having a high complexity shape to a condition which has a high frequency.

The visualizing and the displaying may include visualizing and displaying each node included in the input data, visualizing and displaying a node sharing the same condition as a first node to be distinguishable from other nodes, when a user input targeting the first node is detected, and visualizing and displaying the same condition as a first condition to be distinguishable from conditions of the other nodes, when a user input targeting the first condition is detected.

In still another general aspect, there is provided a computer-readable storage medium storing executable instructions to cause a processor to implement a method including analyzing input data having a graph structure, and verifying at least one of a precondition and a post-condition for each node included in the input data, allocating one or more interfaces including a different type of interface for each type of precondition and post-condition, and visualizing and displaying the input data based on the one or more allocated interfaces. Other features and aspects will be apparent from the following detailed description, the drawings, and the claims.

BRIEF DESCRIPTION OF THE DRAWINGS

FIG. 3 is a table illustrating an example of analyzing a precondition and a post-condition with respect to nodes included in input data.

FIG. 4 is a table illustrating an example of interface allocation.

Figure 1:
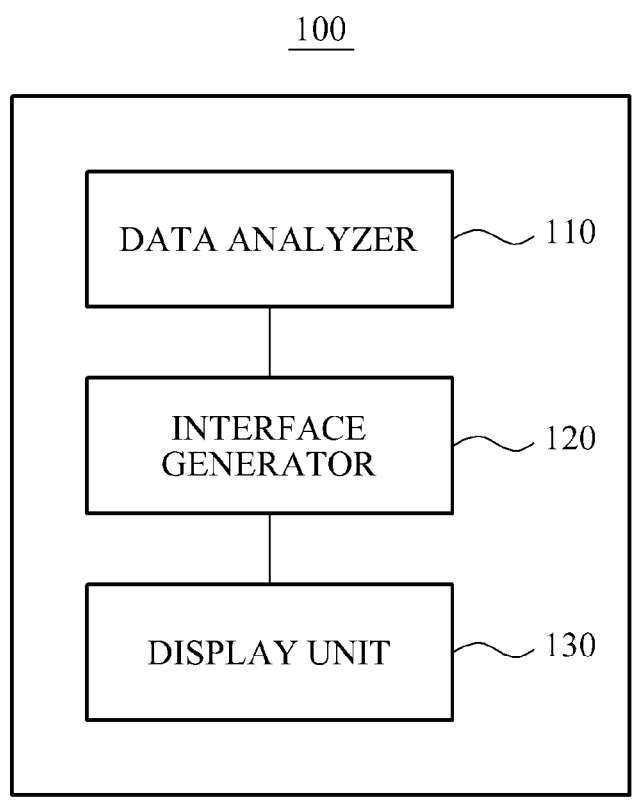
FIG. 1 is a diagram illustrating an example of a data processing apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates an example of a data processing apparatus 100. Data analyzer 110 may analyze graph-type input data. The input data may include a plurality of nodes. The plurality of nodes may be connected to each other using branches. Each of the nodes may include at least one condition. The conditions may correspond to, for example, a precondition or a post-condition. The nodes and the conditions are further described with reference to FIG. 2.

The data analyzer 110 analyzes the input data and determines at least one of a precondition and a post-condition of each node included in the input data, and may determine whether the precondition and the post-condition are the same as each other. Various types of examples may be used as a criterion to determine whether the precondition and the post-condition are the same as each other, such as those described with reference to FIG. 2.

An interface generator 120 generates an interface for each condition. The interface may be allocated differently for each type of condition. For example, the interface may be allocated using a different shape and/or color to be visualized and displayed. Generation of the interface will be further described with reference to FIG. 4.

A display unit 130 may visualize and display the input data using the generated interface. The display unit 130 may display all the nodes included in the input data and conditions of the nodes. However, where a number of nodes increases, or where a number of types of the precondition and the post-condition increases, it may be difficult for a user to recognize or discover nodes to be connected to a particular node using the above simple display.

For example, based on a node designated in advance or a node designated by a user, the display unit 130 may display only a condition and/or other nodes associated with the designated node, and may not display other conditions or other nodes not associated with the designated node. In some embodiments, the display unit 130 may display conditions and/or nodes not associated with the designated node if a separate predicate is received. In some embodiments, a node associated with a condition designated in advance or selected by the user may be all that is displayed.

An operation of the display unit 130 will be described with reference to FIGS. 6 through 8.

Figure 2:
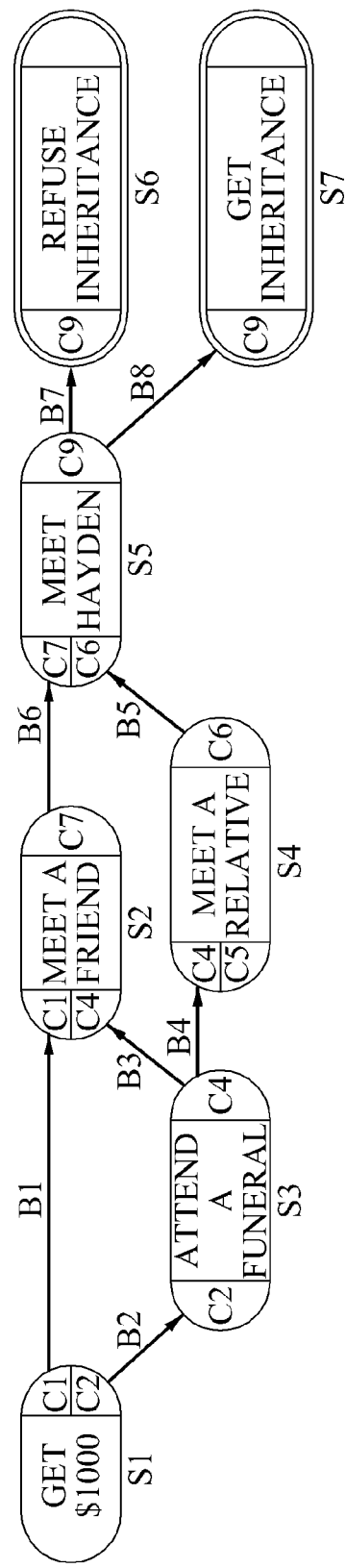
FIG. 2 is a diagram illustrating examples of input data that have been analyzed and displayed.

FIG. 2 illustrates input data that has been analyzed and visualized, for example, using the data processing apparatus 100 of FIG. 1. In the example shown in FIG. 2, the input data includes nodes S1, S2, S3, S4, S5, S6, and S7. The nodes S1, S2, S3, S4, S5, S6, and S7 are connected to each other using branches. In this example, the branches include B1, B2, B3, B4, B5, B6, B7, and B8.

A graph-typed data structure may be displayed. For example, the graph-typed data structure may be used to express a game scenario map of a video game, an operating scenario map with respect to embedded software of an electronic device, and the like. The graph-typed data structure may be used to express various fields of flowcharts. Accordingly, the graph-typed data structure that may be processed by the data processing apparatus 100 may be applicable in various types of fields.

Each of the nodes S1, S2, S3, S4, S5, S6, and S7 may include at least one condition. The at least one condition may correspond to a precondition or a post-condition. The precondition indicates a condition for a current node to be called by a previous node. The post-condition indicates a condition for the current node to call a next node.

A criterion may be used to determine whether a precondition and a post-condition are the same as each other. The criterion may use a particular action (hereinafter, a predicate) of a user, for example, a mouse click in a graphic user interface (GUI) input environment, to determine whether the precondition and the post-condition are the same. The criterion may make a determination, for example, based on a mouse click, a mouse drag, a keyboard input, a touch on a touch screen, a combination thereof, and the like. Such a condition may represent an abstract concept, for example, the knowledge that the user has in an education domain or the game level that users have passed so far in a game domain.

The criterion may determine whether the precondition and the post-condition are the same as each other based on an object with respect to the predicate. For example, the determination may be based on which object the mouse click is performed, which key is input on a keyboard, which object is touched on the touch screen, a combination thereof, and the like.

Each of the nodes S1, S2, S3, S4, S5, S6, and S7 may be connected to the precondition and/or the post-condition. For example, where a current node is S1, and condition C1 corresponding to a post-condition of the current node S1 is satisfied, the node S2 of which the condition C1 is a precondition, may be called and be selected as a subsequent node. In this example, condition C1 is a post-condition for S1 and a precondition for S2. Thus, when condition C1 is satisfied, the current node can move from S1 to S2 Where a condition C7 corresponding to a post-condition of the node S2 is satisfied, the node S5 of which a precondition is the condition S7 may be called and be selected as a subsequent node.

Where the input data is in the graph type, the data analyzer 110 of FIG. 1 may analyze the input data to analyze a precondition and a post-condition of each of nodes included in the input data. An example of an analysis result is shown in FIG. 3.

In the table of FIG. 3, a node identifier (D) denotes an identifier of each of the nodes S1, S2, S3, S4, S5, S6, and S7. The nodes are indexed in the node ID. The data analyzer 110 may analyze at least one of a precondition and a post-condition with respect to each of the nodes S1, S2, S3, S4, S5, S6, and S7. The analysis may be performed by traversing a graph-typed data structure. As shown, one or more of the nodes may have a "NILL" value for a precondition and/or a post-condition. The "NILL" value is an example where no condition exists.

As shown in FIG. 2, the node S1 does not include preconditions and includes conditions C1 and C2 as post-conditions. They are shown in the table illustrated in FIG. 3. Similarly, the node S2 includes conditions C1 and C4 as preconditions, and includes the condition C7 as a post-condition.

Although in the example shown in FIG. 3 the data analysis result of the data analyzer 110 is sorted in an order of the node identifiers, in some embodiments, the data analysis result may be sorted in an order of preconditions or post-conditions.

Where the input data analysis is performed as above, the interface generator 120 may generate an interface of each condition. The interface may be generated using a shape and/or color that is visualized and displayed.

FIG. 4 is a table that illustrates an example of interface allocation. The interface generator 120 may analyze a frequency of each condition of the analyzed input data. In this example, the frequency denotes a number of times that a corresponding condition is used as a precondition and/or a post-condition in the input data.

In the example of the analyzed input data of FIG. 4, a condition C1 is used ten times in the input data, a condition C2 is used twice in the input data, and a condition C3 is used five times in the input data.

In this example, the interface may correspond to a shape and/or a color of each condition. Among conditions of the input data, a triangular shape and a white color are allocated to the condition C1. A rectangular shape and a red color are allocated to the condition C2, and a circular shape and a blue color are allocated to the condition C3.

An allocation policy of the shape and/or the color may be different based on the analyzed frequency. Brightness and/or saturation levels may be applied to conditions based upon the frequency of the condition. For example, a color having a low brightness and/or saturation may be allocated to the condition C1 of which a frequency is relatively high with respect to the other conditions C2 and C3. In some embodiments, a color having a high brightness and/or saturation may be allocated to the condition C1 of which a frequency is relatively high, with respect to the other conditions C2 and C3.

The shape having a relatively high complexity may be allocated to the condition C1 of which the frequency is relatively high. The complexity may be in proportion to a number of vertexes of a diagram, a number of surfaces of the diagram, and the like.

Where predicates of conditions are the same as each other, the same shape may be allocated. Where objects of the predicates are the same as each other, the same color may be allocated.

Where the shape and the color are allocated to the conditions using the interface generator 120, the display unit 130 may visualize and display the input data using the allocated interface.

Figure 5:
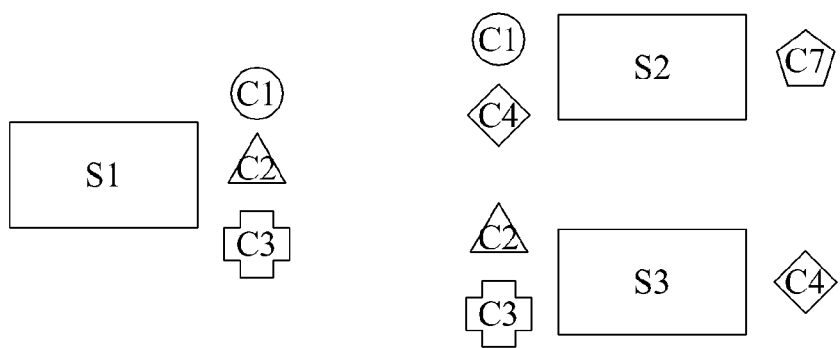
FIG. 5 is a diagram illustrating an example of arranging at least one of a precondition and a post-condition for each node.

FIG. 5 illustrates a result of arranging at least one of a precondition and a post-condition for each node. The result may be used for interface display after interface allocation. In this example, node S1 does not include a precondition and includes conditions C1, C2, and C3 as post-conditions, a node S2 includes conditions C1 and C4 as preconditions and includes a condition C7 as a post-condition, and a node S3 includes the conditions C2 and C3 as preconditions and includes the condition C4 as a post-condition as an analysis result of input data. A different shape and/or color may be allocated to each of the conditions C1, C2, C3, and C4. The display unit 130 may visualize and display the above result.

Figure 6:
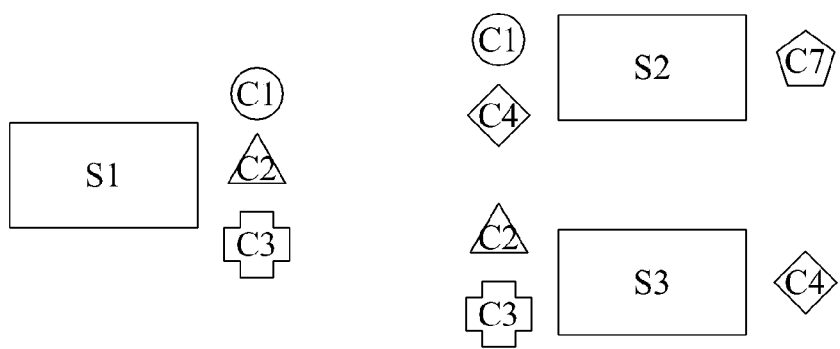
FIG. 6 is a diagram illustrating an example of a data visualization result to be displayed.

FIG. 6 illustrates an example of a data visualization result to be displayed. As shown in FIG. 6, a user viewing the displayed data visualization result may recognize the three post-conditions C1, C2, and C3 of the node S1. The user may also recognize that post-conditions C1 and C4 are preconditions of node S2, and that post-conditions C2 and C3 are preconditions of node S3.

The display unit 130 may display all the nodes and conditions included in the input data. For example, the display unit 130 may display the nodes S1, S2, and S3 and all the conditions of the nodes S1, S2, and S3, together.

However, where the number of nodes increases or the types preconditions and/or post-conditions increase, the user may not recognize the data visualization result by viewing the simple display.

For example, when a node is designated in advance or designated by a user, only the conditions and/or other nodes associated with the designated node may be displayed. Other conditions and/or other nodes not associated with the designated node may not be displayed at all, or may be displayed when a separate predicate occurs. The other conditions and/or the other nodes may also be displayed to look blurred so that the conditions and the other nodes associated with the designated node may be predominantly displayed.

Based on a condition designated in advance or designated by a user, it is possible to display only a node associated with the designated condition. Thus, where it is difficult to visualize nodes and/or conditions included in the input data due to a large number of the nodes or the conditions, the nodes and conditions associated with the designated node may be predominantly displayed.

Figure 7:
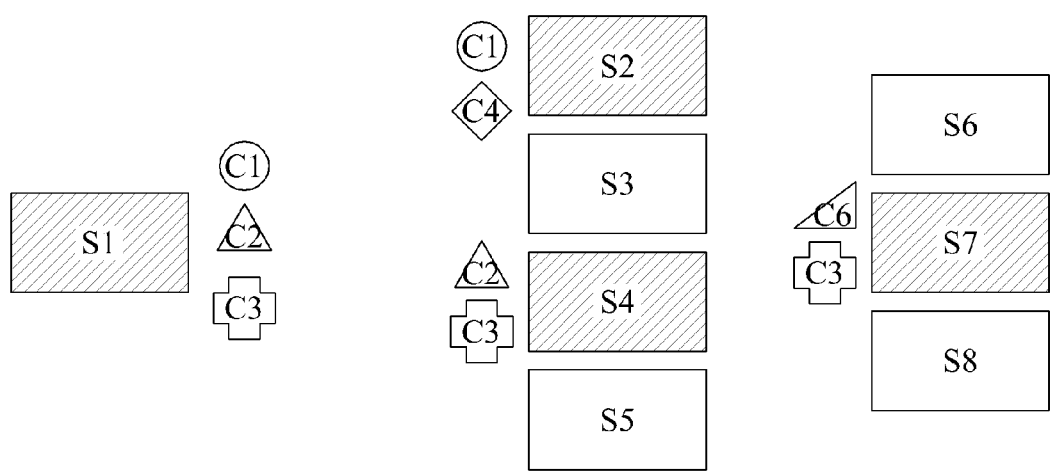
FIG. 7 is a diagram illustrating an example of nodes visualized to be distinguishable from other nodes.

FIG. 7 illustrates an example of displaying nodes to be distinguishable from other nodes. The nodes may be displayed distinguished from other nodes, for example, automatically, or when a particular user input is detected.

An example of displaying only a node associated with a node designated in advance or designated by a user is described above with reference to FIG. 6. However, it is only an example and thus various embodiments may be applicable. For example, it is possible to separately visualize only the other nodes and/or conditions associated with a selected particular node, based on the selected particular node, and the like.

Other examples include, expressing the nodes associated with the particular node by applying a twinkling effect, a highlighting process, a particular color to the nodes, and the like.

The above example may be applied to a condition and/or node associated with the particular node designated in advance or designated by a user, based on the particular node. The visual effect applied to a portion of the nodes and/or the conditions to be distinguishable from the other nodes and/or conditions may be referred to as a "clue".

As described above, the particular node or condition selected by the user may be detected using various types of examples. For example, in a GUI environment, the user may control a mouse to approach a particular node. The user may click on the particular node, or the user may drag the particular node, and the like. The same examples may be applied to a case where the user selects the particular condition.

Figure 8:
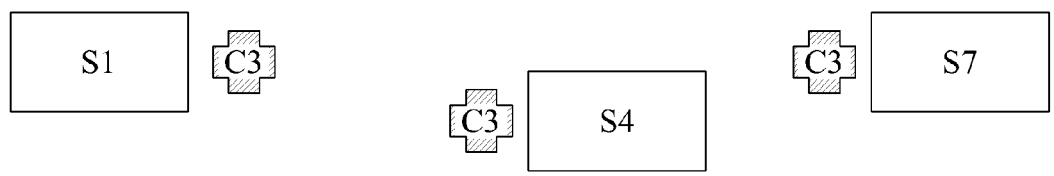
FIG. 8 is a diagram illustrating an example of visualizing one or more conditions to be distinguishable from other conditions, when a user input is detected.

FIG. 8 illustrates a result of visualizing one or more conditions to be distinguishable from other conditions when a user input is detected.

For example, where a condition C3 is selected, only the condition C3 and nodes S1, S4, and S7 associated with the condition C3 may be displayed. For example, where the user makes a mouse cursor approach the condition C3 or clicks on the condition C3, a uniform color may be applied to all instances of the condition C3, and other nodes and conditions may not be displayed.

Figure 9:
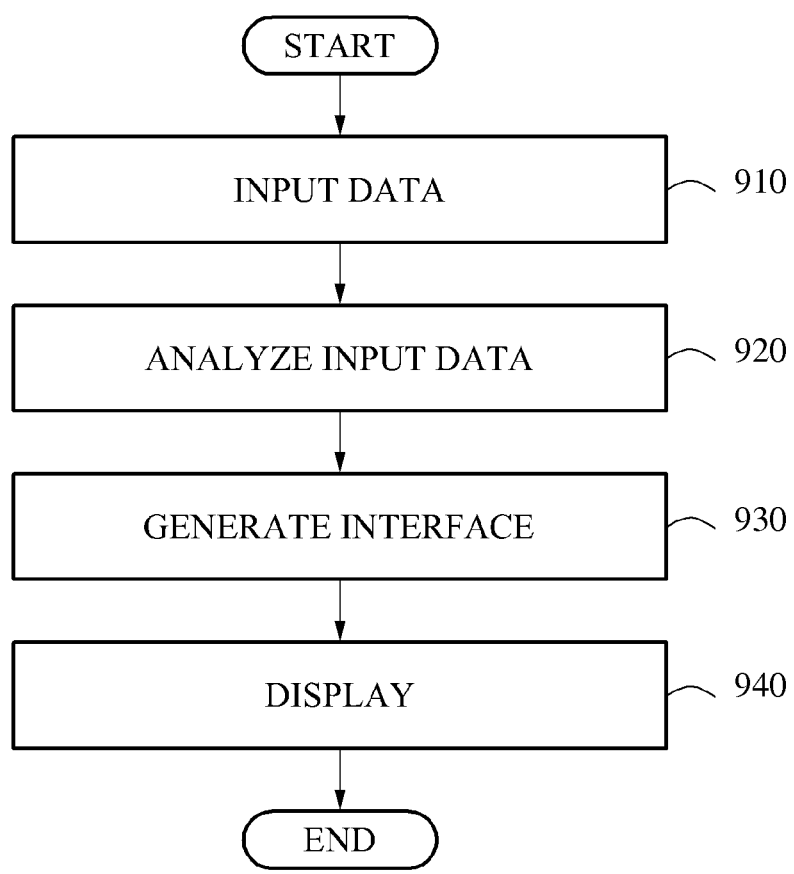
FIG. 9 is a flowchart illustrating an example of a data processing method.

FIG. 9 illustrates a flowchart of an example data processing method. In operation 910, graph-typed data is input. The input data may include a plurality of nodes. The nodes may be connected to each other using branches. Each of the nodes may include at least one condition. The conditions may correspond to a precondition or a post-condition.

In operation 920, the input data is analyzed. For example, a meaning of a precondition and a post-condition of each of the nodes included in the input data may be analyzed. The method may determine whether the precondition and the post-condition are the same as each other. Determining whether the precondition and the post-condition are the same as each other may be determined using a predicate, an object of the predicate, and the like. Examples of the analyzed input data are described above with reference to FIGS. 4 and 5.

In operation 930, an interface for each condition is generated. The interface may be differently allocated for each type of the condition. For example, a different shape and/or color to be visualized and thereby be displayed may be allocated. Generation of the interface is described above with reference to FIG. 4.

In operation 940, the input data is displayed using the generated interface. All the nodes included in the input data and the conditions of the nodes may be displayed together. However, where a number of the nodes increases or where types of the precondition and the post-condition increase, the above simple display alone may not enable a user to easily recognize the input data.

Therefore, when a node is designated in advance or designated by a user, only the conditions and/or the nodes associated with the designated node may be displayed. Other conditions and/or nodes not associated with the designated node may not be displayed, or may only be displayed when a separate predicate occurs.

Based on a condition designated in advance or selected by the user, only a node associated with the condition may be displayed. The above examples are described above with reference to FIGS. 6 through 8.

The processes, functions, methods and/or software described above including a data processing method may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A data processing apparatus, comprising:
a data analyzer configured to analyze input data comprising a graph structure, and to verify at least one of a precondition and a post-condition of each node included in the input data;
an interface generator configured to allocate a different shaped interface for each type of the precondition and the post-condition, and to allocate a node interface for the each node; and
a display unit configured to display the input data based on the allocated interfaces,
wherein the interface generator allocates a high complexity shape in response to a frequency of a condition being high.

2. The apparatus of claim 1, wherein:
the data analyzer is further configured to verify a predicate and a predicate object of the at least one of the precondition and the post-condition; and the interface generator is further configured to allocate a different interface for each type of predicate and predicate object.

3. The apparatus of claim 1, wherein the interface generator is further configured to allocate a different color for each different interface.

4. The apparatus of claim 3, wherein the interface generator is further configured to allocate a color comprising a low brightness, in response to the frequency of a condition being high.

5. The apparatus of claim 3, wherein the interface generator is further configured to allocate a color comprising a low saturation, in response to the frequency of a condition being high.

6. The apparatus of claim 1, wherein in response to a user input targeting a first node, the display unit is further configured to display a second node sharing the same condition as the first node in order to distinguish the first node and the second node from other nodes.

7. The apparatus of claim 1, wherein in response to a user input targeting a first condition, the display unit is further configured to display a second condition comprising the same condition as the first condition in order to distinguish the first condition and the second condition from other conditions.

8. The apparatus of claim 7, wherein the user input comprises a mouse cursor approaching a portion of the displayed first condition.

9. The apparatus of claim 7, wherein, in response to the display unit displaying a condition comprising the same condition as the first condition to be distinguishable from the other conditions, the display unit is further configured to perform a twinkling process for a displayed condition corresponding to the same condition as the first condition.

10. The apparatus of claim 1, wherein
the precondition indicates a condition for a current node to be called by a previous node; and
the post-condition indicates a condition for the current node to call a next node.

11. A data processing method of a data processing apparatus, the method comprising:
analyzing input data comprising a graph structure;
verifying at least one of a precondition and a post-condition of each node included in the input data;
allocating a different shaped interface for each type of the precondition and the post-condition, and a node interface for each node; and
displaying the input data based on the allocated interfaces,
wherein the allocating comprises allocating a high complexity shape, in response to a frequency of a condition being high.

12. The method of claim 11, wherein the analyzing comprises:
verifying the at least one precondition and post-condition of each node included in the input data; and
verifying a predicate and a predicate object of the at least one of the precondition and the post-condition.

13. The method of claim 12, wherein the analyzing further comprises allocating a different interface for each type of predicate and predicate object.

14. The method of claim 11, wherein the allocating comprises allocating a different color for each different interface.

15. The method of claim 14, wherein the allocating comprises allocating a color comprising a low brightness, in response to frequency of a condition being high.

16. The method of claim 11, wherein the displaying comprises:
displaying a second node sharing a same condition as a first node to be distinguishable from other nodes, in response to a user input targeting the first node being detected; and
displaying the same condition as a first condition to be distinguishable from conditions of the other nodes, in response to a user input targeting the first condition being detected.

17. A non-transitory computer-readable storage medium storing executable instructions to cause a processor to implement a method, comprising:
analyzing input data comprising a graph structure;
verifying at least one of a precondition and a post-condition for each node included in the input data;
allocating a different shaped interface for each type of the precondition and the post-condition, and a node interface for the each node; and
displaying the input data based on the allocated interfaces,
wherein the allocating comprises allocating a high complexity shape, in response to a frequency of a condition being high.

* * * * *